US009304213B2

(12) United States Patent
Rabedeau et al.

(10) Patent No.: US 9,304,213 B2
(45) Date of Patent: Apr. 5, 2016

(54) X-RAY POSITION DETECTOR AND IMPLEMENTATION IN A MIRROR POINTING SERVO SYSTEM

(71) Applicant: The Board of Trustees of the Leland Stanford Junior University, Palo Alto, CA (US)

(72) Inventors: Thomas A. Rabedeau, San Jose, CA (US); Douglas G. Van Campen, Milpitas, CA (US); Peter M. Stefan, Sunnyvale, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 186 days.

(21) Appl. No.: 14/203,294

(22) Filed: Mar. 10, 2014

(65) Prior Publication Data
US 2015/0276948 A1 Oct. 1, 2015

Related U.S. Application Data

(60) Provisional application No. 61/782,754, filed on Mar. 14, 2013.

(51) Int. Cl.
*G01T 1/29* (2006.01)
*H01J 31/49* (2006.01)
*G01T 1/28* (2006.01)

(52) U.S. Cl.
CPC ... *G01T 1/28* (2013.01); *G01T 1/29* (2013.01); *G01T 1/2907* (2013.01); *H01J 31/49* (2013.01)

(58) Field of Classification Search
CPC ........... G01T 1/29; G01T 1/28; G01T 1/2907; H01J 31/49
See application file for complete search history.

(56) References Cited

U.S. PATENT DOCUMENTS 4,095,109 A * 6/1978 Aichinger ............... H01J 47/02 250/374
5,387,795 A * 2/1995 Kuzay ....................... G01T 1/29 250/336.1

OTHER PUBLICATIONS

Smith. "Front End X-ray Beam Position Moinotrs at the Canadian Light Source." Sep. 2006.*
Winick. "Synchrotron Radiaton Research." 1980. Plenum Press, NY. Chapter 3, pp. 27-60.*

* cited by examiner

*Primary Examiner* — David J Makiya
*Assistant Examiner* — Dani Fox
(74) *Attorney, Agent, or Firm* — Lumen Patent Firm

(57) ABSTRACT

An X-ray beam position and stability detector is provided having a first metal blade collinear with a second metal blade, where an edge of the first metal blade is opposite an edge of the second metal blade, where the first metal blade edge and the second metal blade edge are disposed along a centerline with respect to each other, where the metal blades are capable of photoelectron emission when exposed to an x-ray beam, a metal coating on the metal blades that is capable of enhancing the photoelectron emission, or suppressing energy-resonant contaminants, or enhancing the photoelectron emission and suppressing energy-resonant contaminants, a background shielding element having an electrode capable of suppressing photoelectron emission from spurious x-rays not contained in an x-ray beam of interest, and a photoelectron emission detector having an amplifier capable of detecting the photoelectron emission as a current signal.

11 Claims, 2 Drawing Sheets

X-RAY POSITION DETECTOR AND IMPLEMENTATION IN A MIRROR POINTING SERVO SYSTEM

CROSS-REFERENCE TO RELATED APPLICATIONS

This application claims priority from U.S. Provisional Patent Application 61/782,754 filed Mar. 14, 2013, which is incorporated herein by reference.

STATEMENT OF GOVERNMENT SPONSORED SUPPORT

This invention was made with Government support under grant (or contract) no. DE-AC02-76-SF00515 awarded by the Department Of Energy. The Government has certain rights in this invention.

FIELD OF THE INVENTION

The present invention relates generally to X-ray beams. More particularly, the invention relates to enhanced X-ray beam stability for positioning during X-ray beam applications, where an x-ray position detector is provided that senses the position of an x-ray beam.

BACKGROUND OF THE INVENTION

The continued evolution to lower emittance synchrotrons and smaller beam size places greater demands on X-ray beam position stability at the experimental stations. Stability in synchrotron beams at the focus is critical for reliable data collection. The focus can be tens of meters away from the source point. X-ray mirrors have limits in stability due to environmental heating/cooling effects, ground stability underneath the mirror system or fluxuations in cooling water temperatures. Various factors can influence beam stability ranging from fast transients originating, for example, from brief mechanical disturbances to longer-term diurnal or seasonal drifts of building foundations.

What is needed is a device and method to sense the position of an x-ray beam during x-ray beam applications for enhanced x-ray beam stability and positioning.

SUMMARY OF THE INVENTION

To address the needs in the art, an X-ray beam position and stability detector is provided that includes a first metal blade and a second metal blade, where the first metal blade is collinear with the second metal blade, where an edge of the first metal blade is opposite an edge of the second metal blade, where the first metal blade edge and the second metal blade edge are disposed along a centerline with respect to each other, where the metal blades are capable of photoelectron emission when exposed to an x-ray beam, a metal coating on the metal blades, where the metal coating is capable of i) enhancing the photoelectron emission, or ii) suppressing energy-resonant contaminants, or iii) enhancing the photoelectron emission and suppressing energy-resonant contaminants, a background shielding element, where the background shielding element comprises an electrode capable of suppressing photoelectron emission from spurious x-rays not contained in an x-ray beam of interest, and a photoelectron emission detector is operated by an appropriately programmed computer, where the photoelectron emission detector comprises an amplifier, wherein the amplifier is capable of detecting the photoelectron emission as a current signal.

In one aspect of the invention, the metal blades can include beryllium metal blades or other electrically conducting low Z materials with high x-ray transmission such as carbon.

According to another aspect of the invention, the metal coating can include Titanium or other low Z metal film such as aluminum, vanadium, chromium, or iron with metal coating selection determined by avoiding resonant absorption in the x-ray energy band width of interest.

In a further aspect of the invention, the background shielding element can include carbon or beryllium.

In another aspect of the invention, the metal blades are separated by a distance in a range of 2 mm to 20 mm.

In yet another aspect, the metal blades are disposed in a helium environment, where the photoelectron emission ionize the helium proximal to the metal blades, where the ionized helium are capable of amplifying the photoelectron emission signal detected by the amplifier of the detector.

In a further aspect of the invention, the metal blades are disposed in a vacuum environment.

According to one aspect of the invention, the appropriately programmed computer is capable of operating on data from the detector to determine a level of the photoemission from each the first metal blade.

In yet another aspect, the invention further includes a positioning element operated by the appropriately programmed computer, where the positioning element is capable of aligning the X-ray beam along the centerline, where the X-ray beam is centered equally each the metal blade, where the x-ray beam position is determined by signals A from the first metal blade and signal B from the second metal blade, where computing (A−B)/(A+B) will equal zero when the x-ray beam is centered. Here, in one aspect the detector includes an error signal, where the error signal is fed into a Proportional/Integral control loop operated by the appropriately programmed computer, where an output from the appropriately programmed computer is fed back to the positioning element for position correction of the X-ray beam. In another aspect, the positioning element comprises an X-ray mirror pitch mover.

DETAILED DESCRIPTION

An X-ray beam position and stability detector is provided that includes a first metal blade and a second metal blade, where the first metal blade is collinear with the second metal blade, where an edge of the first metal blade is opposite an edge of the second metal blade, where the first metal blade edge and the second metal blade edge are disposed along a centerline with respect to each other, where the metal blades are capable of photoelectron emission when exposed to an x-ray beam, a metal coating on the metal blades, where the metal coating is capable of i) enhancing the photoelectron emission, or ii) suppressing energy-resonant contaminants, or iii) enhancing the photoelectron emission and suppressing energy-resonant contaminants, a background shielding element, where the background shielding element comprises an electrode capable of suppressing photoelectron emission from spurious x-rays not contained in an x-ray beam of interest, and a photoelectron emission detector is operated by an appropriately programmed computer, where the photoelectron emission detector comprises an amplifier, wherein the amplifier is capable of detecting the photoelectron emission as a current signal.

The current invention provides a mirror pointing servo system to enhance beam stability on the Hz to diurnal time scale. In one embodiment, the key item in this control system is the x-ray null-position detector.

In one embodiment, the invention is used as a 'null detector' for keeping an x-ray beam location centered. Here, the X-ray null-position detector has sub-micron position sensitivity with 10's of Hz response band pass to diurnal. Moreover the position sensitivity of the detector scales with beam focus size and the null position is nearly photon energy independent (ie., <10 um zero offset over 6.0-20 keV, no resonant absorption structure above titanium edge). The detector operates in a helium environment, or in a rough vacuum to high vacuum environment with minimal beam absorption, where the invention is well suited for continuous mirror pointing servo applications that are essentially transparent to end user data collection. Application of the invention has been demonstrated showing routine X-ray beam stability of 1 µm rms over diurnal time frames and even sub-micron over shorter time periods.

Figure 1:
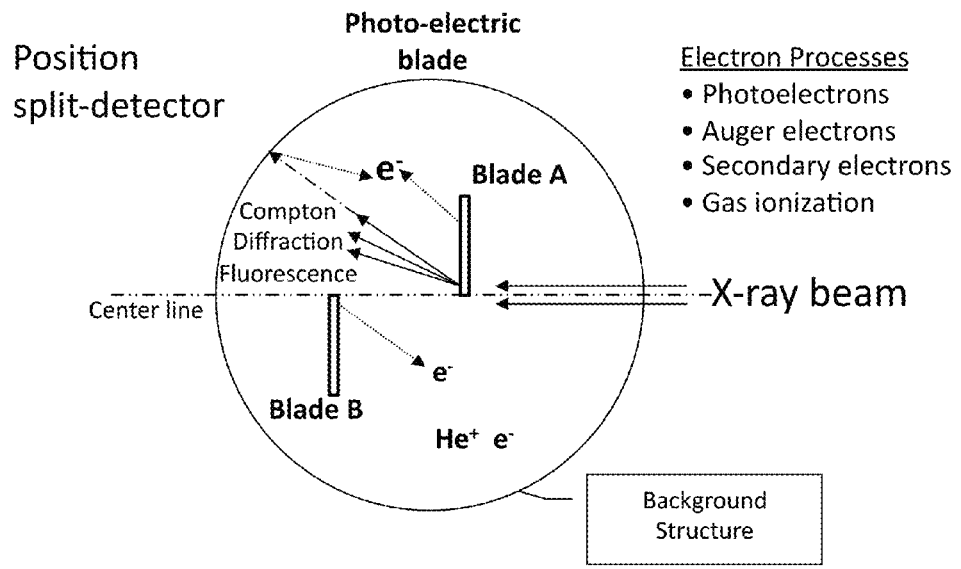
FIG. 1 shows an X-ray beam passing through a photoelectric blade having two thin beryllium 'blades' that are staggered in the x-ray path by a few millimeters but have their edged aligned on a centerline with respect to each other, according to one embodiment of the invention.

In one embodiment, an X-ray beam passes through two thin beryllium 'blades' that are staggered in the x-ray path by a few millimeters but have their edged aligned on a centerline with respect to each other, as shown in FIG. 1. The x-rays cause the blades to photo-emit electrons. According to different embodiments, the blades may have a thin coating like titanium to enhance the signal and/or suppress unwanted energy-resonant contaminates in the blades. These photoelectrons are detected as a current signal in the blades via current amplifier. For the helium embodiment, the energetic photoelectrons ionize helium nearby the blades. This causes an amplification of the signals being detected. If the x-ray beam is mostly on one blade compared to the other, the signals in the blades will be different and indicate the position of the x-ray beam. If the X-ray beam is centered equally on both blades, the signals will be equal. Position of the x-ray beam is determined by signals 'A' and 'B' from each blade by computing $(A-B)/(A+B)$ which will equal zero when the x-ray beam is centered.

Figure 2:
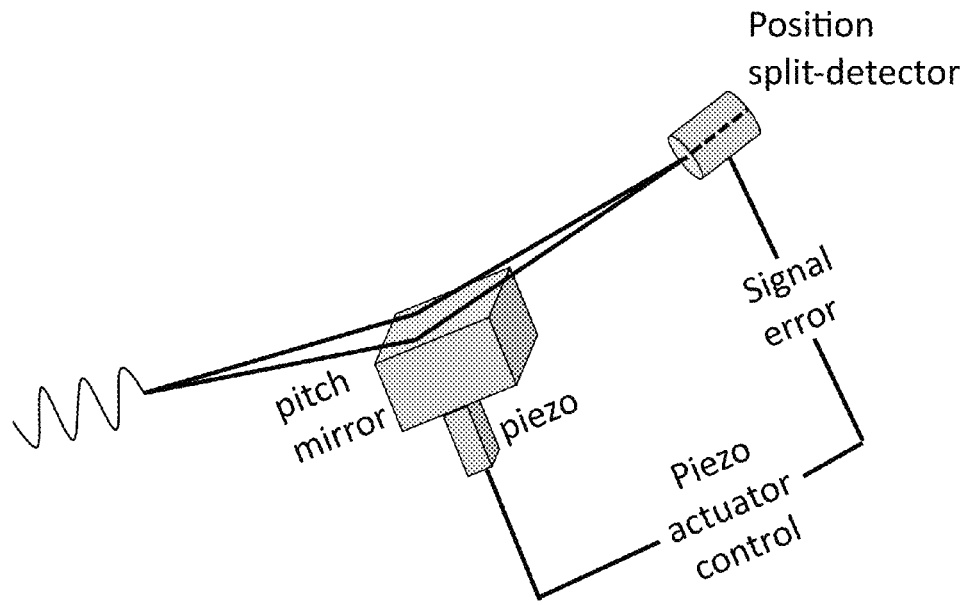
FIG. 2 shows a schematic of an error signal obtained from a position sensitive detector near a beam focus, where the error signal is used to control piezo high voltage, and piezo provides mirror fine pitch control with typical full range of motion +/−30 μrad or +/−0.6 mm or more focus motion, according to one embodiment of the invention.

According to one embodiment shown in FIG. 2, the detector is used in a servo control system to keep an x-ray beam position constant. The detector provides an error signal, which is fed into a Proportional/Integral control loop and fed back to an X-ray mirror pitch mover for position correction.

The invention provides sensitivities in sensing position to the sub-micro level. The detector is always in the x-ray beam without much attenuation to the x-ray beam, where the X-ray beam passes through the detector without much absorption. Further, the detector does not drift significantly with different X-ray Energy (tested 6 KeV to 20 KeV). There are no energy resonant position changes over a large energy range like iron absorption edge at 7112 eV for example. According to different embodiments, the positioning detector operates in Helium or vacuum by changing the bias supply voltage from −50V to +9V, respectively.

According to a further embodiment, the coatings on the sensing Beryllium foil can be changed for different energy range used. Further, the positioning detector can be used as an X-ray intensity monitor by having just one foil.

According to the invention, the carbon electrodes surrounding the Beryllium foil do not contribute to unwanted background signals. Carbon is a low electron emitter and does not fluoresce in the hard energy x-ray range.

In one embodiment, the beryllium foil has ~1000 or more angstroms coating of titanium. Because the photoelectric effect used in the process only occurs in the first 100 Angstroms of the surface, having a high-purity metal evaporated onto the surface enables one to use underlining materials that are hard to make pure like beryllium. This also can be used to optimize the signal yield vs. the x-ray energy used.

In a further embodiment, the beryllium foils are split by ~8 mm along the beam path. This prevents crosstalk. Splitting them between electrodes makes them in their own 'electric field' potential.

Figure 3:
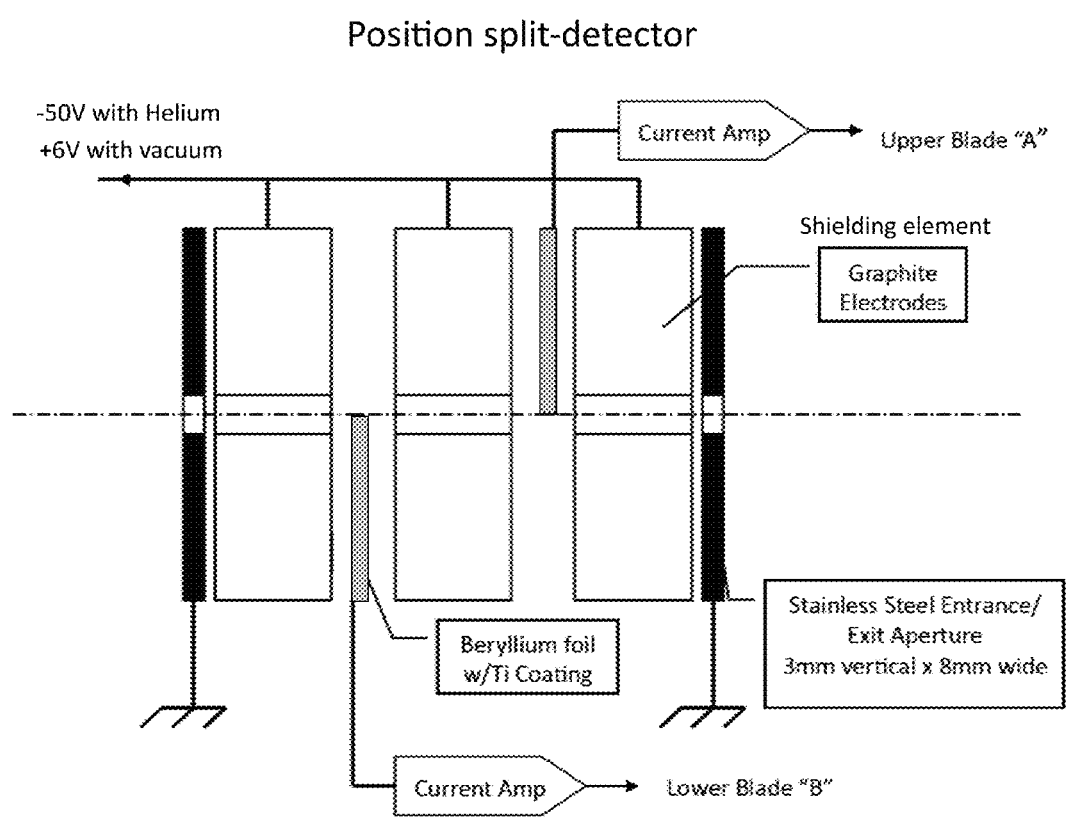
FIG. 3 shows a cross section view of one embodiment of the invention, where shown is the detector electrode geometry.

FIG. 3 shows a cross section view of one embodiment of the invention, where shown is the detector electrode geometry. Here, the sensing elements are shown as the titanium-coated beryllium blades, where each of the blades is in their own electric field. When photoelectrons are generated through interaction with the incident x-rays, they produce a current that can be detected. When the detector is used with Helium, the photoelectrons ionize the helium in a cascade. The potential around the beryllium is such that they collect the ionized electrons from the helium. This amplifies the signal. Since the two beryllium blades are separated by an electrode, the electrons generated by each foil stay localized so there is minimal crosstalk between the ionized gas volume surrounding the beryllium. Photoelectrons are created by the incident x-ray beam interaction with both the beryllium and titanium coating, however only those originating from the titanium coating escape the surface and contribute to the signal. As such, the measured current is not significantly influenced by impurities contained in the beryllium. The Current measured from each blade is proportional to the x-ray flux incident on the blade. The Graphite suppresses any additional electron generation from stray x-rays or collisions with electrons or ions. In one embodiment, the carbon shielding element is also an electrode in which a bias voltage is applied a bias voltage of either +6V for vacuum or −50V for helium, and the range of voltage from helium can be from −10V to −100V depending on the blade separation distance. In one aspect of the invention, the metal blades can include beryllium metal blades or other electrically conducting low Z materials with high x-ray transmission such as carbon. In another aspect of the invention, the metal blades are separated by a distance in a range of 2 mm to 20 mm. In a further aspect of the invention, the metal blades are disposed in a vacuum environment.

According to another aspect of the invention, the metal coating can include titanium or other low Z metal film such as aluminum, vanadium, chromium, or iron with metal coating selection determined by avoiding resonant absorption in the x-ray energy band width of interest.

In a further aspect of the invention, the background shielding element can include carbon or beryllium.

According to one aspect of the invention, the appropriately programmed computer is capable of operating on data from the detector to determine a level of the photoemission from each the first metal blade.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, four blades can be combined into one detector for two axis of x-ray positioning sensing.

All such variations are considered to be within the scope and spirit of the present invention as defined by the following claims and their legal equivalents.

What is claimed:

1. An X-ray beam position and stability detector, comprising:
   a. a charged first metal blade and a charged second metal blade, wherein said charged first metal blade is collinear with said charged second metal blade, wherein an edge of said charged first metal blade is opposite an edge of said charged second metal blade, wherein said charged first metal blade edge and said charged second metal blade edge are disposed along a centerline with respect to each other, wherein said charged metal blades are capable of photoelectron emission when exposed to an x-ray beam;
   b. a metal coating on said charged metal blades, wherein said metal coating is capable of i) enhancing said photoelectron emission, or ii) suppressing energy-resonant contaminants, or iii) enhancing said photoelectron emission and suppressing energy-resonant contaminants;
   c. an entrance plate comprising an entrance aperture and an exit plate comprising an exit aperture;
   d. a first carbon electrode, a second carbon electrode and a third carbon electrode, wherein said first carbon electrode and said second carbon electrode surround said charged first metal blade, wherein said second carbon electrode and said third carbon electrode surround said charged second metal blade, wherein said charged first metal blade is disposed in a first electric field formed by said first carbon electrode and said second carbon electrode, wherein said charged second metal blade is disposed in a second electric field formed by said second carbon electrode and said third carbon electrode, wherein said first carbon electrode is adjacent to said entrance plate, wherein said third carbon electrode is adjacent to said third carbon electrode; and
   e. a photoelectron emission detector operated by an appropriately programmed computer, wherein said photoelectron emission detector comprises an amplifier, wherein said amplifier is capable of detecting said photoelectron emission as a current signal.

2. The X-ray beam position and stability detector of claim 1, wherein said charged metal blades comprise beryllium or carbon.

3. The X-ray beam position and stability detector of claim 1, wherein said metal coating is selected from the group consisting of titanium, aluminum, vanadium, chromium, and iron.

4. The X-ray beam position and stability detector of claim 1, wherein said background shielding element comprises carbon or beryllium.

5. The X-ray beam position and stability detector of claim 1, wherein said charged metal blades are separated by a distance in a range of 2 mm to 20 mm.

6. The X-ray beam position and stability detector of claim 1, wherein said charged metal blades are disposed in a helium environment, wherein said photoelectron emission ionize said helium proximal to said metal blades, wherein said ionized helium are capable of amplifying said photoelectron emission signal detected by said amplifier of said detector.

7. The X-ray beam position and stability detector of claim 1, wherein said charged metal blades are disposed in a vacuum environment.

8. The X-ray beam position and stability detector of claim 1, wherein said appropriately programmed computer is capable of operating on data form said detector to determine a level of said photoemission from each said first metal blade.

9. The X-ray beam position and stability detector of claim 1 further comprises a positioning element operated by said appropriately programmed computer, wherein said positioning element is capable of aligning said X-ray beam along said centerline, wherein said X-ray beam is centered equally each said charged metal blade, wherein said x-ray beam position is determined by signals A from said first charged metal blade and signal B from said second charged metal blade, wherein computing $(A-B)/(A+B)$ will equal zero when said x-ray beam is centered.

10. The X-ray beam position and stability detector of claim 9, wherein said detector comprises an error signal, wherein said error signal is fed into a Proportional/Integral control loop operated by said appropriately programmed computer, wherein an output from said appropriately programmed computer is fed back to said positioning element for position correction of said X-ray beam.

11. The X-ray beam position and stability detector of claim 9, wherein said positioning element comprises an X-ray mirror pitch mover.

* * * * *